United States Patent
Will et al.

(10) Patent No.: US 7,130,501 B2
(45) Date of Patent: Oct. 31, 2006

(54) MESO-SCALE STRICTLY NON-BLOCKING N×N OPTICAL CROSSBAR SWITCH USING PRECISION SERVO CONTROLS

(76) Inventors: Peter M. Will, 27222 Elena Rd., Los Altos Hills, CA (US) 94022; John R. Rowlette, Sr., 3473 Gilman Common, Fremont, CA (US) 94538

(*) Notice: Subject to any disclaimer, the term of this patent is extended or adjusted under 35 U.S.C. 154(b) by 255 days.

(21) Appl. No.: 10/367,709

(22) Filed: Feb. 19, 2003

(65) Prior Publication Data

US 2005/0041910 A1 Feb. 24, 2005

(51) Int. Cl.
*G02B 6/35* (2006.01)
(52) U.S. Cl. ............................................ 385/18; 385/17
(58) Field of Classification Search ............... None
See application file for complete search history.

(56) References Cited

U.S. PATENT DOCUMENTS

| | | | | |
|---|---|---|---|---|
| 4,470,662 A * | 9/1984 | Mumzhiu | ........... | 385/19 |
| 5,204,922 A * | 4/1993 | Weir et al. | ........... | 385/18 |
| 5,420,946 A * | 5/1995 | Tsai | ........... | 385/22 |
| 5,867,294 A * | 2/1999 | Sakai | ........... | 398/129 |
| 6,097,858 A * | 8/2000 | Laor | ........... | 385/16 |
| 6,418,247 B1 * | 7/2002 | Presley | ........... | 385/18 |
| 6,445,844 B1 * | 9/2002 | Neukermans et al. | ........... | 385/18 |
| 6,567,574 B1 * | 5/2003 | Ma et al. | ........... | 385/16 |
| 2002/0003919 A1 * | 1/2002 | Morimoto | ........... | 385/18 |
| 2002/0181839 A1 * | 12/2002 | Brown et al. | ........... | 385/16 |
| 2004/0091200 A1 * | 5/2004 | Ikegame | ........... | 385/18 |

* cited by examiner

*Primary Examiner*—Rodney Bovernick
*Assistant Examiner*—M. J. Stahl
(74) *Attorney, Agent, or Firm*—Parsons & Goltry; Robert A. Parsons; Michael W. Goltry

(57) ABSTRACT

A design is presented for an N×N crossbar switch. A crossbar switch is one of the basic components of Optical Switching Networks. An optical N×N switch has the capability of connecting any light beam from the input of the switch to any output of the switch without interfering with other light beams. That is each single input is connected to one and only one of the output ports without interfering with any other beam or beams. The design presented is based on the use of precision meso-scale mechanics of the size typically found in miniature disc drives and meso-scale optical components. This meso-scale mechanics is then controlled or driven by precision servo-electronics and software to achieve the correct switching. The precision servo-mechanisms, meso-scale mechanics, electronics and software control are designed to work together to self-compensate for assembly or manufacturing defects and deleterious environmental, including temperature, effects.

3 Claims, 4 Drawing Sheets

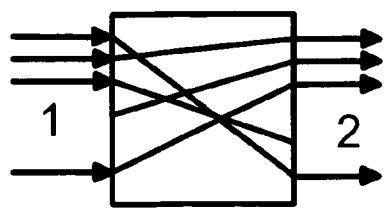
FIGURE 1
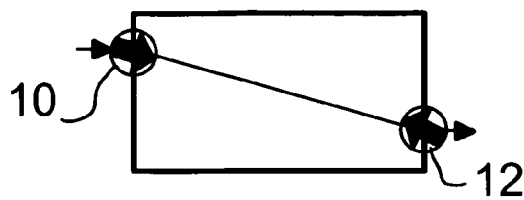
FIGURE 2
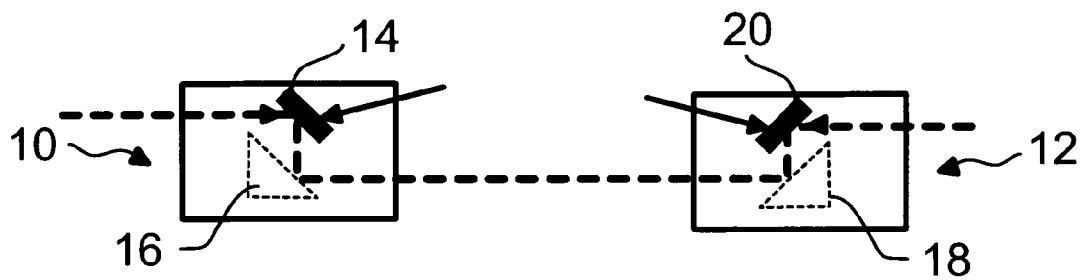
FIGURE 3
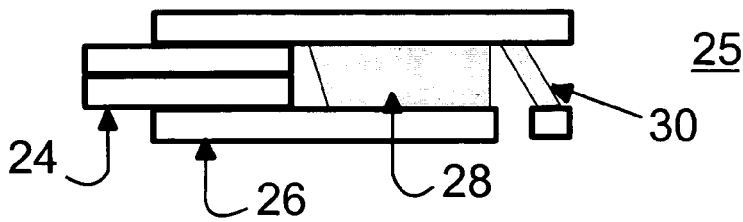
FIGURE 4
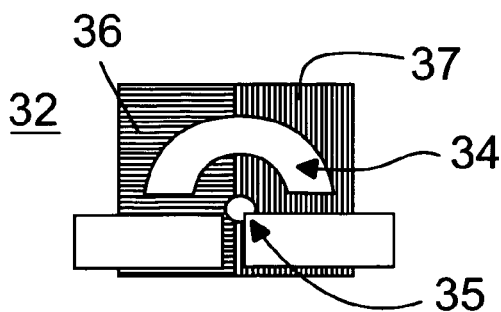
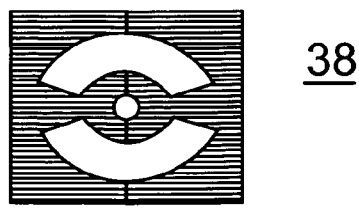
FIGURE 5     FIGURE 6

MESO-SCALE STRICTLY NON-BLOCKING N×N OPTICAL CROSSBAR SWITCH USING PRECISION SERVO CONTROLS

FIELD OF THE INVENTION

This invention relates in general to optical switches and more particularly to multiple input and multiple output optical switches.

BACKGROUND OF THE INVENTION

Optical switching networks, incorporating a plurality of optical fiber input ports and output ports, require some apparatus for switching the various input ports between the various output ports. A crossbar switch is one of the basic components of optical switching networks. An optical switch with, for example, N inputs and N outputs, must have the capability of connecting any light beam from any of the N input ports of the switch to any of the N output ports of the switch without interfering with any other beam or beams.

Various designs exist in the literature for non-blocking and blocking switches: the present invention is concerned with non-blocking switches in which an optical input at a given port may be sent to a second available or free output port without requiring any other established connection to be changed.

It would be highly advantageous, therefore, to remedy the foregoing and other deficiencies inherent in the prior art.

Accordingly, it is an object of the present invention to provide a new and improved meso-scale strictly non-blocking optical crossbar switch.

SUMMARY OF THE INVENTION

Briefly, to achieve the desired objects of the instant invention in accordance with a preferred embodiment thereof, provided is an optical crossbar switch including a plurality of light director input devices each including an input ferrule constructed to receive an end of an optical fiber for providing a light input and a plurality of light director output devices each including an output ferrule constructed to receive an end of an optical fiber for providing a light output. Each of the plurality of light director input devices includes input optics positioned to receive input light from the input ferrule and rotatable to direct the received input light to a selected one of the plurality of light director output devices. Each of the plurality of light director output devices includes output optics rotatable into optical alignment with input light directed from one of the plurality of light director input devices, the output optics being positioned to direct received input light to the output ferrule.

The desired objects and purposes of the present invention are further realized in an optical crossbar switch wherein the input optics of each of the plurality of light director input devices includes a first input mirror attached to the input ferrule and positioned to direct input light at an angle to a longitudinal axis of the input ferrule and a rotatable input mirror positioned at the angle to receive the directed light and to reflect the received light in a plane generally parallel to the longitudinal axis of the input ferrule to the selected one of the plurality of light director output devices.

BRIEF DESCRIPTION OF THE DRAWINGS

The foregoing and further and more specific objects and advantages of the invention will become readily apparent to those skilled in the art from the following detailed description taken in conjunction with the drawings in which:

FIG. 1 illustrates an optical N×N cross-bar switch;

FIG. 2 illustrates a simplified plan view of one path for a light director in the cross-bar switch of FIG. 1;

FIG. 3 illustrates a simplified and enlarged side elevation view of the light director of FIG. 2;

FIG. 4 illustrates various components of an orthogonal beam ferrule for an I/O (input/output) port in accordance with the present invention;

FIG. 5 is a schematic representation of a voice coil motor designed for wide rotation, for use in an optical switch in accordance with the present invention;

FIG. 6 is a schematic representation of a voice coil motor designed for extended rotation and double torque, for use in an optical switch in accordance with the present invention;

DETAILED DESCRIPTION OF THE DRAWINGS

Figure 7:
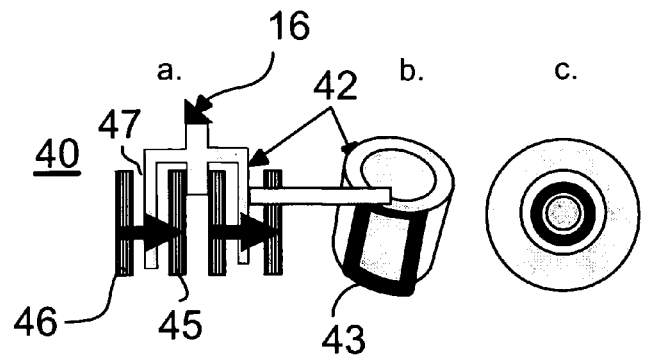
FIG. 7, a, b, and c, illustrate a cylindrical motor and rotating mirror, for use in an optical switch in accordance with the present invention, in a sectional view, a perspective view, and a top plan view, respectively.

Turning to the drawings, in which like reference characters indicate corresponding elements throughout the several views, FIG. 1 illustrates an optical cross-bar switch in which any input light beam 1, on the left, is delivered to an output port 2, on the right without interference from other beams. Various designs exist in the literature for non-blocking and blocking switches: the present invention is concerned with non-blocking switches in which an optical input at a given port may be sent to a second available or free output port without requiring any other established connection to be changed.

The inputs are normally light beams carried by optical fibers. The light may be in the form of either a single wavelength or may be a composition of many wavelengths as is found in Dense Wavelength Division Multiplexing (DWDM) systems. The light that enters the switch can be in many forms. The optical switch is wavelength, modulation rate and protocol independent. All can be accommodated by the switch. Mixtures are also supported. The input may also be any properly collimated light beam.

A major goal of any optical switch is to switch an input light beam at the input port to a selected output port as quickly as possible. For example, SONET protocol requires that the switching occurs in less than 10 milliseconds. The presently disclosed switch is capable of performing the switching typically in less than 3 milliseconds. A second goal of the presently disclosed switch is to achieve minimal loss. The presently disclosed switch is designed to have a loss that is less than 1.5 dB insertion loss.

The light applied to each input port is collimated across the free space region between the input port and the output port by one or more lenses. Since the distance between the input ports and the output ports can vary, careful design considerations are taken to minimize the losses as this distance becomes large for larger switch matrices. At least some minimization of loss is achieved by placing the light launched from the fiber at the focal length of the collimating lens. The size of the collimating lens is chosen to create as flat of a wavefront as possible to minimize the variation in coupling between the input and output ports.

A basic building block of the present switch is a light director (generally designated 10), illustrated in FIG. 2 that directs or points the input to the selected output where a similar light director (generally designated 12), simultaneously directs or points the output to the input. This dual pointing is necessary to ensure that the maximum light power is directed from the input to the output. The basic building block or light director 10 or 12 is replicated N times in both input and output to make an N×N switch and N and M times respectively to make an N×M switch.

FIG. 2 shows a plan view of light directors 10 and 12 while FIG. 3 shows a side elevation view of light directors 10 and 12. The light derived from an input fiber at light director 10 is reflected downwards from a fixed mirror 14 to a rotary mirror 16, represented by a triangle or wedge. The light is reflected or transmitted to an output rotary mirror 18, represented by a triangle or wedge, from which it is reflected upwards, as shown, to a second fixed mirror 20 from which it is reflected out to form the output beam. The light beam impinging on rotary mirror 16 is swept in a horizontal plane orthogonal to the vertical axis of rotary mirror 16 to be picked up by output rotary mirror 18.

The input light shown in FIG. 3 is generated from the fiber by a lens system, illustrated in FIG. 4, hereinafter referred to as an 'orthogonal ferrule' and designated 25. Orthogonal ferrule 25 of FIG. 4 includes an optical fiber 24 contained within a cylindrical ferrule 26. Ferrule 26 also contains a GRIN (gradient index of refraction) lens 28 and a 45° mirror 30 to reflect the light orthogonally downwards. A GRIN lens is to be preferred for space and compactness reasons. Placing the exit pupil of optical fiber 24 at the focal point of a (collimator) lens makes a normal collimated (i.e. parallel) beam at the lens output. Orthogonal ferrule 25 of FIG. 4 also includes a 45° mirror 30 placed after Grin lens 28 to reflect the light orthogonally to the fiber as illustrated in the side elevation drawing of FIG. 3. The exit pupil of optical fiber 24 in FIG. 4 must match the entrance pupil of GRIN lens 28 for maximally efficient light collection and propagation. This design requirement ensures that all of the light from optical fiber 24 enters GRIN lens 28 and exits in the output beam thus minimizing the insertion loss.

Low back reflection is ensured by cleaving optical fiber 24 by a few degrees (usually at 8 degrees) relative to the longitudinal axis (not shown), or if a GRIN lens is used as the collimator by polishing the face of the GRIN lens at an 8 degree angle, shown schematically for GRIN lens 28 in FIG. 4. The resulting output beam is collimated but detailed study by Rayleigh showed that the output beam will have divergent properties determined according to the well-known Rayleigh formula that describes the necking of the beam and the location of the neck. The neck position, in normal optical practice, may be placed at the entrance pupil of the receiving lens (e.g. 45° mirror 30) but sometimes a mid-point of the collimating lens between the input and output is used.

The collimating GRIN lens 28 or lens axis must be collinear and on-axis with the axis of optical fiber 24. This is usually accomplished by using a ferrule 26 with a precise, centered inner diameter in which is placed an optical fiber with a precise outside cladding diameter and a GRIN lens with a precise outer diameter. The ferrule must be long enough to ensure that the fiber and lens are sufficiently collinear as to avoid angular misalignment. Choosing the correctly matched inner and outer diameters and length results in an assembly that is mutually bore-sighted. During the assembly process the separation between optical fiber 24 and GRIN lens 28 or other lens is controlled to be the desired focal distance to place the Rayleigh waist at the correct desired distance down the beam. The parts are usually cemented in place using epoxies but they may be soldered in place if desired if metalized components are used.

As is well known, using cleaved or angle polished components results in beam walk-off of a few degrees. That is the output beam will exit the GRIN at a non-zero angle to the longitudinal axis of the GRIN and/or the ferrule axis and in the dihedral plane defined by the polishing angle. If both the fiber and the GRIN are polished they must be mutually aligned. (The assembly operated in a gross sense as a prism.) A thin prism may be used to affect the walk-off or the mutual centers of the fiber and GRIN may be off-set by the correct amount.

In the present embodiment it is desirable for the light beam to be orthogonal to the ferrule axis so a mirror (e.g. mirror 30) or prism is placed in ferrule 26 to reflect the axial light in an orthogonal direction. Normally setting the mirror at 45 degrees to the optical axis would provide the desired orthogonal reflection. But due to the walk-off effect, the mirror angle is adjusted to 45 degrees plus or minus the walk-off angle and then the assembly is fixed in place using glue, epoxy, solder, welding, or other appropriate joining technique.

In some applications it is enough to assemble the ferrule, fiber and GRIN and after rotating the fiber to the correct angle as needed, epoxying the assembly directly. Sometimes the fiber comes in an array and cannot be twisted without compromising the loss in the fiber assembly. In this case, it is necessary to assemble all the parts in the ferrule and to rotate and fix the ferrule assembly at the correct angle to the fiber as the last step.

Light directors, similar to light directors 10 and 12 of FIG. 3 (i.e. right angle Collimators) are to be used in a N×N optical switch, shown schematically in FIG. 1, where light from an input fiber is directed to one of the several output fibers. The output fibers are aligned/directed out of the plane of the paper with their light reflected at right angles into the plane of the paper. The fibers may be in a bundle for instance. In the switch operation, the light from an input light director is directed at one of several output light directors. The light from the input fiber sweeps in a plane as the rotatable mirror in the light director is rotated and the output light director entrance pupils (i.e. the rotatable mirror of the output light director) must lie in this plane. The rotatable mirror of the output light director must be pointed at the input light director so that the center of the exit pupil of the rotatable source and the center of the entrance pupil of the output light director must be aligned in 5 dimensions, X, Y, Z, yaw and pitch. Assembly techniques can accomplish all but the yaw axis. Rotating the ferrule (or the ferrule/fiber) to the correct angle aligns the yaw axis. Using a power meter to maximize power transfer is a convenient assembly aid before the fixing in place is done.

The optical switches, i.e. light directors 10 and 12, described in FIG. 3 deflect a collimated beam of light by reflecting it off a rotatable mirror, i.e. mirrors 16 and 18. Rotation of the mirror causes the light direction to be changed by Snell's Law. The task of taking light from an input fiber, collimating it, switching it and having it enter a selected one of a plurality of output fibers requires a small, fast acting, rotary actuator capable of doing high precision angular positioning of a light beam to a few microns at a radius of 50 mm or so. The rotary actuator preferably should be flat to make the switch as flat as possible though this is not an absolute requirement.

The motors described in more detail below are built to operate on electromagnetic principles in which a current carrying conductor in a magnetic field experiences an orthogonal force, i.e. on the Lorentz Principle. This effect is used in voice-coil motors used as head actuators in disc drives. A voice-coil motor, generally designated 32, is shown schematically in FIG. 5. In motor 32, a coil 34 on a bearing 35 operates in a magnetic field produced by two magnets 36 and 37 of opposite polarity, shown in FIG. 5 with vertical and horizontal shading, respectively. The slanted portion of each coil experiences a force orthogonal to the leg of the coil with a direction that depends on the direction of current through the coil. Using a pair of opposite polarity magnets ensures that the forces, and therefore the torques, add rotationally. The normal read head motor has a bearing that is off-set from the magnets but here the motor design can be improved in several dimensions. First the limited rotation can be improved by placing the bearing in the center of the magnet. This is an impossible position for a magnetic disc drive since the drive magnet would affect the disc coating but is acceptable in optical switches. Motor 32 swings through an arc defined by the width of the coil. The generated forces will oppose if the coil is contained entirely in the field of a single magnet and net torque will drop to zero. Motor 32 is un-commutated. FIG. 5 shows a coil/magnet arrangement that allows in the limit 180 degrees of rotation. FIG. 6 shows a different voice-coil motor, designated 38, design that has both extended rotation and double torque.

Figure 10:
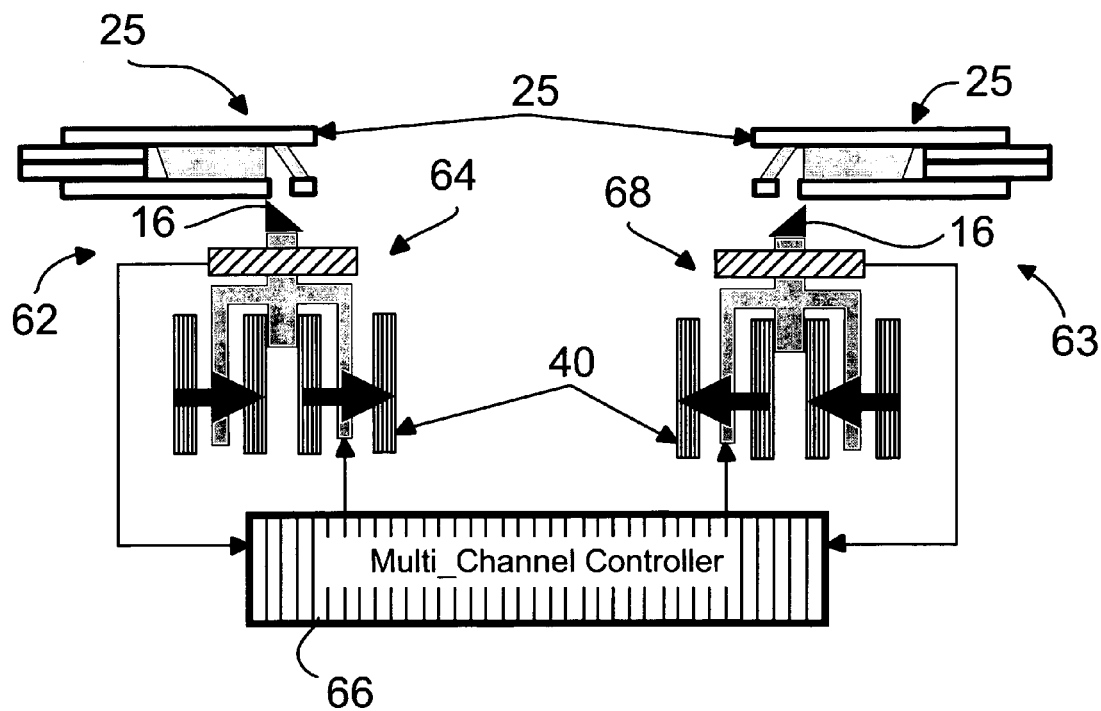
FIG. 10 illustrates a single optical channel, similar to FIG. 8, further including dual control of the ferrule/motor units at the input port and the output port, in accordance with the present invention.

A normal, commonly purchased angular position transducer is used as a position pick off (as illustrated in FIG. 10 and explained more fully with reference thereto) to give a signal that can be used in a normal servo feedback scheme to give the required positioning accuracy needed to feed switched light through a lens into a second fiber; thus making a switch.

Typically voice-coil motors in miniature disc drives are designed to have a response time of about 1–2 milliseconds. These motor designs are capable of reaching a desired position starting from a first position in less than a millisecond. This is due to the multiple coils and the use of multiple magnets.

Motor 32, described above, is essentially planar and can be made very thin, of the order of 4 mm or so. Relaxing this constraint allows other motor designs. Another motor design, for example, is to fold the coil over as shown in FIG. 7. Here a motor, generally designated 40, includes a cylindrical structure 42 that carries coils 43. An inner cylindrically shaped magnet 45 and an outer cylindrically shaped magnet 46 are mounted coaxially and define a cylindrical air gap 47 therebetween, as illustrated in FIG. 7a. Magnets 45 and 46 are polarized radially to produce a magnetic field in air gap 47. Cylindrical structure 42 forms the rotor of motor 40 and is in the shape of a cup that is rotatably mounted in air gap 47. Drive coils 43 are on the outside of cup-shaped rotor 42. One coil is shown. Only the vertical legs of coils 43 generate force and therefore torque; the top and bottom parts of coils 43 generate no torque in the desired direction of rotation. Several coils may be used depending on the toque required and the range of angular movement required. FIG. 7 shows input rotary mirror 16 of FIG. 3, mounted on cup-shaped rotor 42 for rotation therewith.

Figure 8:
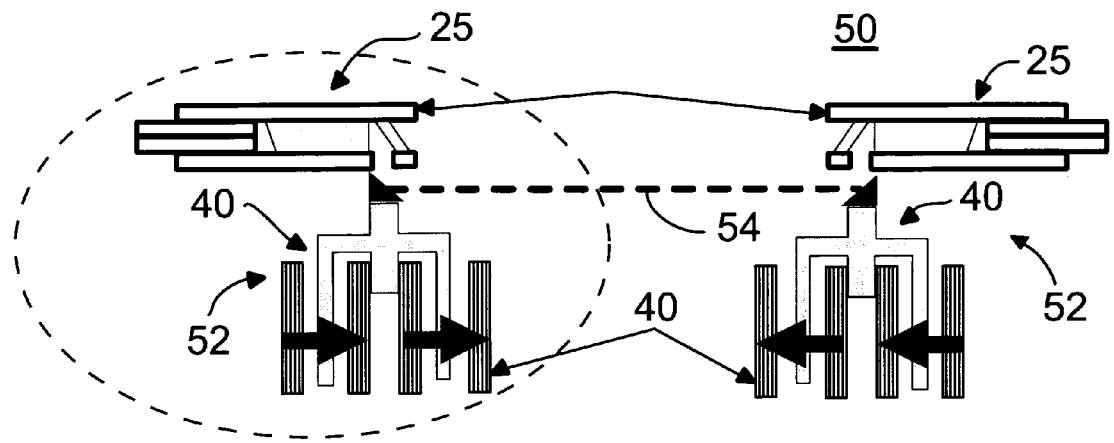
FIG. 8 is a sectional side view of a single optical path in a cross-bar switch, incorporating ferrule/motor units at the input port and the output port, in accordance with the present invention.

An N×N optical switch, generally designated 50, is made by marrying orthogonal ferrule 25 of FIG. 4 to the motors 32, 38 and 40 shown in FIG. 5, 6 or 7, respectively, as shown schematically in FIG. 8 to make a switch unit module, generally designated 52. In N×N optical switch 50, all of the switch unit modules are substantially similar and, therefore, both the input and output switch unit modules are designated 52. The light path from one switch unit module 52 to the other is indicated by a broken line, designated 54.

Figure 9:
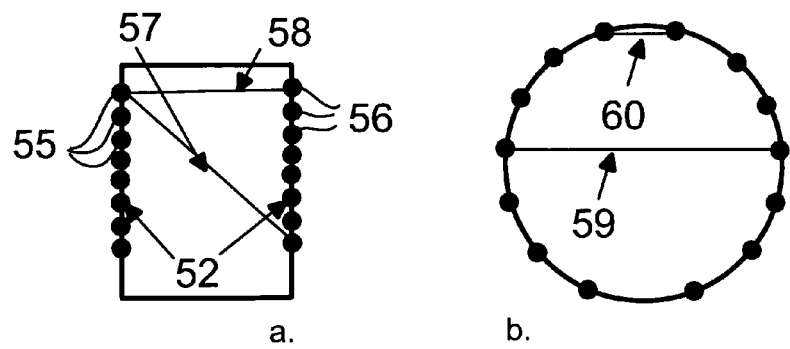
FIG. 9, a and b, are simplified plan views of a rectangular base arrangement of input and output ports and of a circular base arrangement, respectively.

A full N×N switch is made by taking N switch unit modules 52 for the inputs and N switch unit modules 52 for the outputs and arranging them appropriately. FIG. 9 shows two possible arrangements of the input and output modules, illustrated in a and b of FIG. 9. The arrangement in FIG. 9a shows a rectangular base with inputs 55 on the left and outputs 56 on the right. The longest path between an input 55 and an output 56 is designated 57 and the shortest path between an input 55 and an output 56 is designated 58. The longer the longest path, the smaller the variation in the path length, but the larger the potential optical loss. A circular arrangement, illustrated in FIG. 9b, has a longest path between an input and an output, designated 59, and a shortest path between an input and an output, designated 60. The circular arrangement has a shorter shortest path 59 but a larger variation between the shortest and longest. Optical loss considerations make the circular arrangement preferable in general.

The switch unit module 52 of FIG. 8 can be converted to servo-controlled modules 62 and 63, as illustrated in FIG. 10, by the addition of position transducers 64 and 68 and a controller 66. In this example, a ferrule 25 is associated with a rotatable mirror 16 (see FIG. 8), which is mounted on a position transducer 64 mounted for rotation with a motor 65 and a second ferrule 25 is associated with a rotatable mirror 16 (see FIG. 8), which is mounted on a position transducer 68 mounted for rotation with a motor 69. Both position transducers 64 and 68, along with motors 65 and 69, are connected to feedback a position signal and be controlled by, respectively controller 66. Both the position transducers 64 and 66 and controller 66 are common, off the shelf parts. Position transducers 64 and 68 may be digital optical shaft encoders available from a variety of sources or position sensitive optical detectors available from Hammamatsu. Both of these give a position with reference to some base position, and controller 66 may be a Field Programmable Gate Array (FPGA) or a microprocessor. The software in controller 66 uses position transducer 64 to servo-control motor 65 and position transducer 68 to servo-control motor 69. That is controller 66 is time shared between position transducers 64 and 68. Controller 66 is timeshared between the 2N motor/transducer pairs that make up the N×N switch. The servo software can be the common Proportional Integral Derivative (PID) system found in all elementary servo textbooks. The software running in the controller, i.e. the controller system, drives the servo controlling a first motor, say 65, to point the optical beam from rotary mirror 16 of servo-controlled module 62 to the rotary mirror 16 associated with second motor, 69 of servo-controlled module 63 and vice versa. Doing this for all of the N pairs of motors makes the N×N switch.

Anyone skilled in the art will recognize that assembly errors will exist in this scheme. One of the main errors that is possible is in positioning ferrule 25 relative to motor 65 or 69 so that the beam falls at the desired position on the rotating mirror, usually the center of the mirror. Another main error occurs in assembling the motor axis (i.e. the rotary axis of motor 65) to be orthogonal to the base plane (i.e. the plane containing the longitudinal axis of ferrule 25) so that as motor 65 rotates, it sweeps the light beam emanating from rotary mirror 16 parallel to the base plane.

Figure 11:
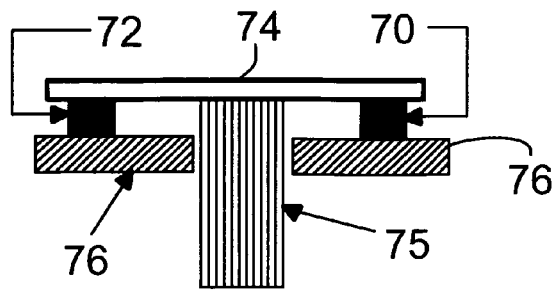
FIG. 11 illustrates calibration and adjustment apparatus incorporated in a motor mount in accordance with the present invention.

The above described errors can be compensated for, as shown in two dimensions in FIG. 11 by using linear actuators, 70 and 72 placed between a motor mount 74 for a motor 75 and a base plate 76 of the switch. Actuation of both actuators 70 and 72 lifts and drops motor 75 vertically while driving one actuator (70 or 72) up and the other actuator (72 or 70) down tilts motor 75. Similar actuators in an orthogonal direction, say one pair of actuators in the X-axis and another pair of actuators in the Y-axis, plus the rotation around the vertical or Z-axis allows roll, pitch and yaw three dimensional adjustments. The three dimensional adjustments adjusted by miniature linear actuators are conveniently implemented by piezo-electric devices. Other miniature linear actuator devices are also possible such as a rotary devices arranged to lift motor mount 74 or base plate 76 by using a kinematic mechanism such as an eccentric cam or a linkage. Piezo-actuators are used in this preferred embodiment because their range of motion is small, their force is large and they can operate at high speed.

The errors described above can be compensated for at assembly time by directing the light beam from the rotary mirror 16 of a first module to the rotary mirror 16 of a second module of a pair of modules, measuring the intensity or received power and using conventional hill-climbing software to maximize the received power. The hill-climbing software executes in the servo controller. Once calibrated the measured values are stored for future operations and re-calibration.

Figure 12:
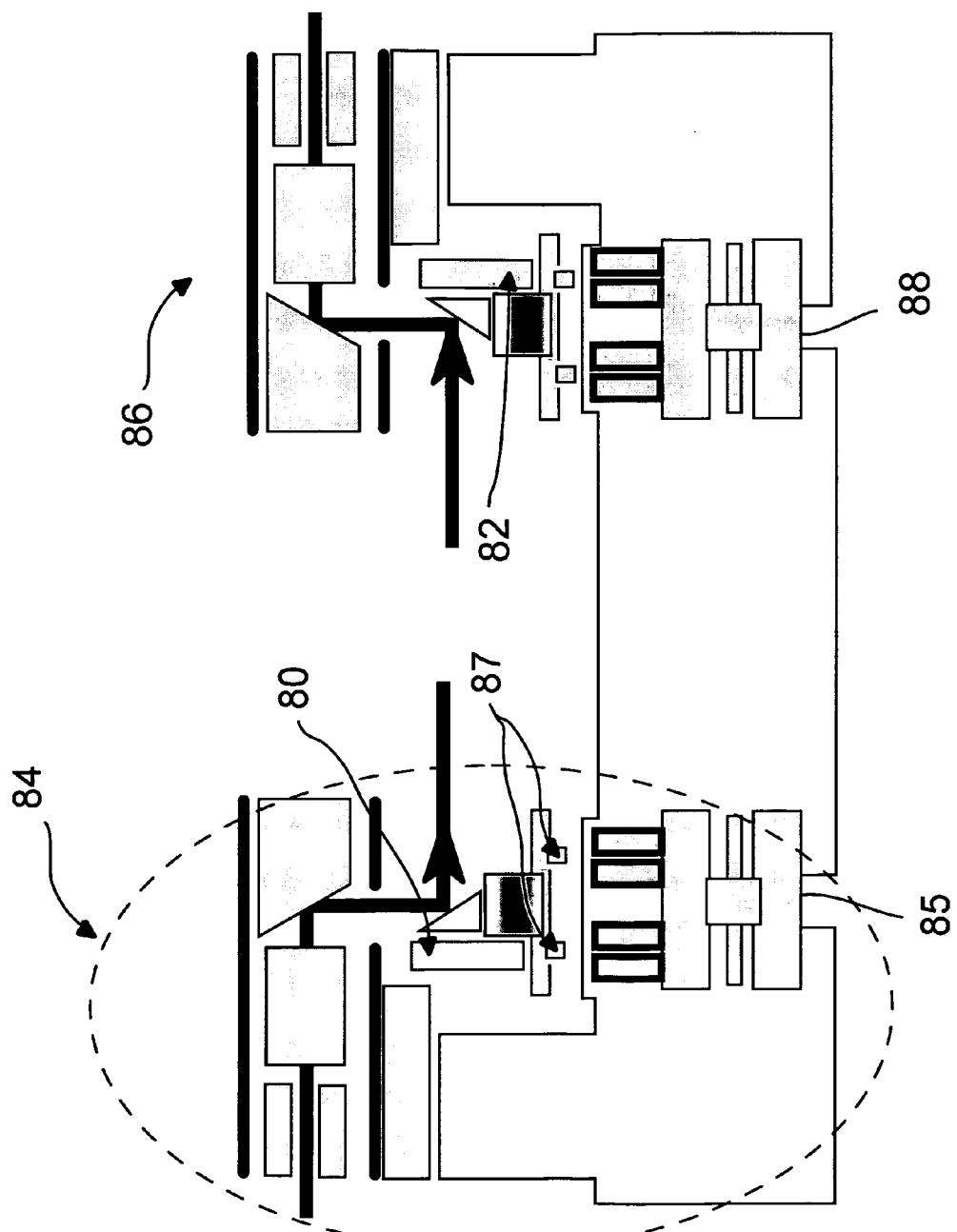
FIG. 12 illustrates a single optical channel, similar to FIG. 10, further incorporating dynamic calibration and adjustment apparatus, similar to that illustrated in FIG. 11, and optical detectors, in accordance with the present invention.

Compensation for dynamic errors in the N×N switch can be achieved by the same principles as described above if a suitable feedback transducer is employed. Industry practice teaches that 1% of the light in the beam transmitted between modules may be used for such calibration purposes. FIG. 12 shows the entire light path from one port to another in a full embodiment of the N×N switch. Here a pair of optical detectors 80 and 82 are added, one to each ferrule/motor light director module or device and attached to, ideally bonded to, and placed behind the rotatable mirror. The rotatable mirror is arranged to be 99% reflective allowing 1% to land on optical detector 80 or 82. The preferred embodiment of optical detectors 80 and 82 is a quad, or quadrant, detector (Hammamatsu is a suggested supplier amongst several) that gives a signal corresponding to where a spot of light lands on its surface. This device tells if the impinging beam is centered or not and if not, the magnitude and angle of the deviation of the landing point from the optical center. Any errors between the center of the rotating mirror and the center of the quad detector can be measured and stored at calibration time for use in dynamic adjustment. Dynamic errors will appear as a dynamic offset of the quad detector. This signal is sent to controller 66 of FIG. 10. The control algorithm first positions the rotatable mirror of the input light director, designated 84 in FIG. 12, by dead reckoning using its own position transducer (designated 85). This initial positioning step gets light impinging on the detector 82 of its target rotatable mirror the output light director, designated 86. The signal from the rotatable mirror of light director 86 is then used to position the rotatable mirror of light director 84 using the linear actuators 87, as described in the discussion of FIG. 10. The same is true in reverse to position the rotatable mirror of light director 86, it uses first its own position transducer (designated 88) and then the target quad on the target ferrule/motor director. Again a PID control scheme may be used, with parameters adjusted for the sensitivity of the transducer, (sometimes called the transducer gain).

N multiple pairs of ferrule/motor light director modules or devices can be positioned so that each input can direct its light to every output and vice versa, as on a circle (see for example the arrangement of FIG. 9b), makes the required N×N switch. In this embodiment, each light director module or device operates as either an input port or an output port.

An N×1 switch using one ferrule motor light director module or device and N statically aligned ferrules without motors can be arranged in either a circle, line or other suitable configuration.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. An optical crossbar switch comprising:
    a plurality of light director input devices each including an input ferrule constructed to receive an end of an optical fiber for providing a light input;
    a plurality of light director output devices each including an output ferrule constructed to receive an end of an optical fiber for providing a light output;
    each of the plurality of light director input devices including input optics positioned to receive input light from the input ferrule and rotatable to direct the received input light to a selected one of the plurality of light director output devices, the input optics of each of the plurality of light director input devices including a first input mirror attached to the input ferrule and positioned to direct input light at an angle to a longitudinal axis of the input ferrule and a rotatable input mirror positioned at the angle to receive the directed-light and to reflect the received light in a plane generally parallel to the longitudinal axis of the input ferrule to the selected one of the plurality of light director output devices;
    each of the plurality of light director output devices including output optics rotatable into optical alignment with input light directed from one of the plurality of light director input devices, the output optics of each of the plurality of light director output devices including a rotatable output mirror rotatable to receive light directed from one of the plurality of light director input devices and to reflect the received light at an angle to a longitudinal axis of the output ferrule to a first output mirror positioned at the angle to receive input light directed at the angle, the output optics being positioned to direct received input light to the output ferrule; and the angular position of each of the rotatable input mirrors and each of the rotatable output mirrors being controlled by a linear actuator to provide optical alignment between substantially a center point of each rotatable input mirror with substantially a center point with each rotatable output mirror.

2. An optical crossbar switch as claimed in claim 1 wherein the linear actuators include piezo-electric actuators.

3. An optical crossbar switch as claimed in claim 1 further including an optical detector associated with each of the rotatable input mirrors and each of the rotatable output mirrors, the optical detector being positioned to receive partial light from the associated rotatable input mirror and rotatable output mirror and connected to supply a feedback signal to the linear actuator.

* * * * *